M. C. FAIRWEATHER & L. W. THEIS.
FIRE EXTINGUISHER.
APPLICATION FILED OCT. 1, 1909.
952,613.
Patented Mar. 22, 1910.
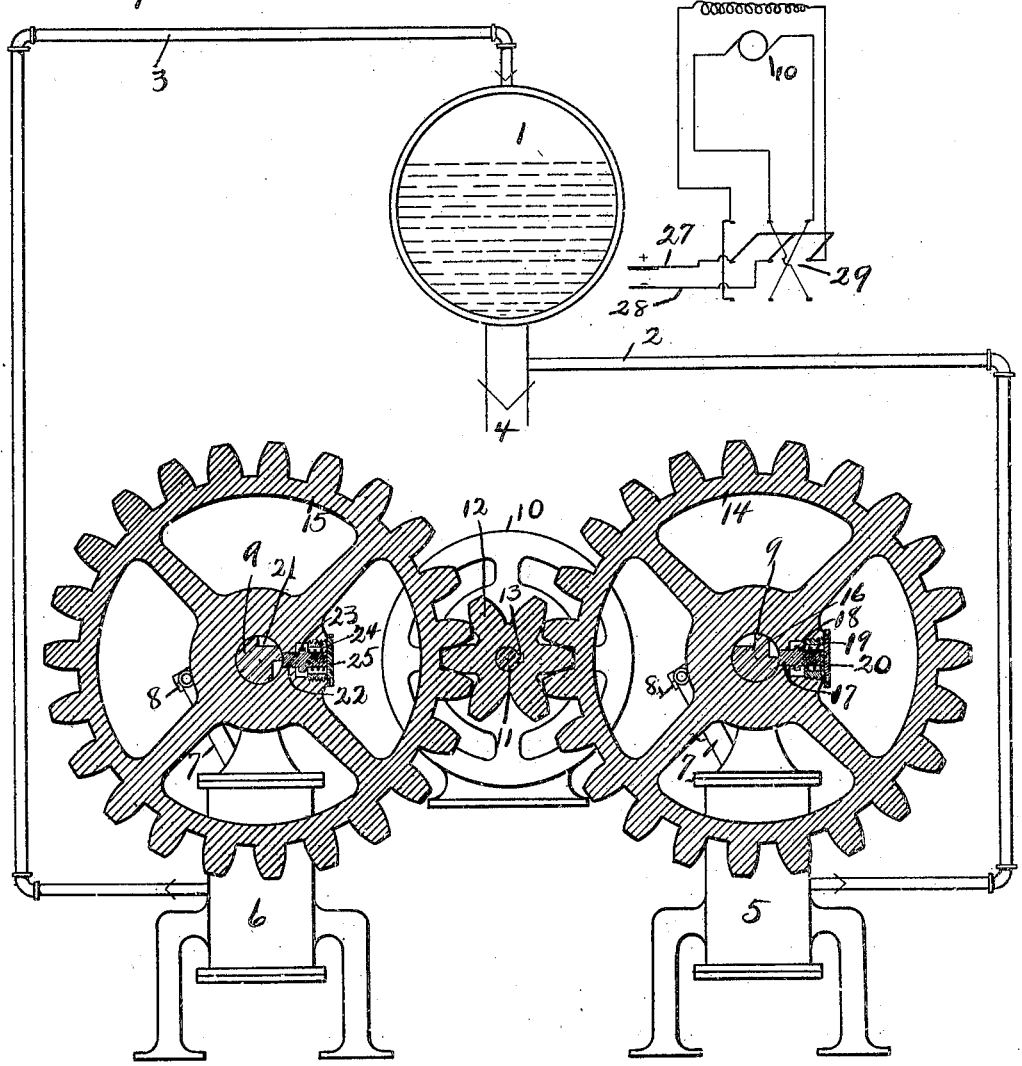
WITNESSES:
INVENTORS

UNITED STATES PATENT OFFICE.

MALCOLM C. FAIRWEATHER AND LEROY W. THEIS, OF CLEVELAND, OHIO.

FIRE-EXTINGUISHER.

952,613.  Specification of Letters Patent.  Patented Mar. 22, 1910.

Application filed October 1, 1909. Serial No. 520,448.

*To all whom it may concern:*

Be it known that we, MALCOLM C. FAIRWEATHER and LEROY W. THEIS, citizens of the United States, residing at Cleveland, in the county of Cuyahoga and State of Ohio, have invented new and useful Improvements in Fire-Extinguishers, of which the following is a specification.

This invention relates to fire extinguishing apparatus, and consists in certain improvements in the construction thereof as will be hereinafter fully described and pointed out in the claims. In some types of such apparatus, commonly called sprinkling systems, water is maintained in the line. A pressure tank is used for this purpose in which the water is stored, partially filling the tank, and on which air under pressure is maintained, so as to keep the liquid under pressure, should there be leakage.

The invention practically consists of a pumping apparatus used in connection with such a pressure tank, and the object of the invention is to simplify this apparatus, and make it more efficient.

The invention is illustrated in the accompanying drawings as follows:

Figure 1 is an elevation of the apparatus, partly in section to better show construction; Fig. 2 is a diagram of the electric driving motor and its reversing switch.

1 marks the pressure tank. Water is maintained in this tank partially filling the tank, and air under pressure is maintained on the water. Where there is leakage it is necessary to pump in additional water, and where there is air leakage, it is necessary to pump in additional air.

2 marks the connecting pipe leading from the water pipe to the pressure tank; 3 the air pipe connecting the air tank with the pressure tank; 4 the pipe leading to the sprinkling system; 5 the water pump; 6 the air pump. These pumps are of ordinary construction, the connecting rod 7 operating the plungers (not shown in each), the connecting rods being connected with the cranks 8 on the driving shafts 9.

A reversing electric motor 10 is utilized for driving the pump. The driving shaft of this motor 11 has the gear 12 fixed on it by means of a key 13.

A gear 14 is journaled on the shaft 9, of the water pump and the gear 15 is journaled on the shaft 9 of the air pump. These gears 14 and 15 have ratchet connection with the shaft 9, the ratchet connection of the gear 14 being such as to drive the shaft when the gear 14 moves in the direction of the hands of a watch, and the ratchet connection of the gear 15 being such as to drive the shaft 9 on the air pump, when the gear 15 moves in a direction opposite to that of the hands of a watch. Gears 14 and 15 both mesh the gear 12, and are arranged on opposite sides of this gear. It will readily be seen that when the gear 12 is driven in one direction, it will drive the gear 15, and consequently operate the air pump, and when it is operated in the opposite direction, the gear 14 will drive its shaft, and consequently operate the water pump, and that where the gear 15 is driving the air pump, the gear 14 is running idle, and on the other hand, where the gear 14 is driving the water pump, the gear 15 is running idle. All that is necessary, therefore, for the operator to do in operating the device is to reverse the motor, and either pump in air or water, and as the pressure of air and water is approximately balanced, the work required of each pump is approximately the same. This is especially so if the water side is pumped up first.

The ratchet mechanism for the gear 14 comprises the ratchet teeth 16 on the shaft 9. The ratchet pawl 17 is arranged in the gear. This pawl has the shoulder 18 against which the spring 19 is arranged, the spring operating against a cap 20. The gear 15 has the same ratchet mechanism, the teeth 21 being arranged on the shaft 9, the ratchet pawl 22 having the shoulder 23, and the spring 24 being arranged against the shoulder, and the cap 25.

We have shown in the diagram a direct current series motor, but it will be understood that any reversing motor may be used. The line wires 27 and 28 are controlled by the reversing switch 29, so as to reverse the motor 10.

What we claim as new is:

1. In a fire extinguisher, the combination of a pressure tank; a water pump; an air pump; a water connection between the water pump and the tank; an air connection between the air pump and the tank; a reversing motor for driving said pumps; and driving connections between the motor and each pump, each driving connection being arranged to drive the pump with the motor running in one direction, and to run idle with the motor running in the opposite direction, and said driving connections being arranged relatively to each other and the pumps to drive one connection while the other connection runs idle.

2. In a fire extinguisher, the combination of a pressure tank; a water pump; an air pump; driving shafts operating said pumps; driving wheels on said shafts; ratchet connections between the wheels and the pump; and a motor for driving said wheels, said ratchet connections being arranged relatively to each other and to the pumps, to drive one pump with the motor operating in one direction, and to drive the other pump with the motor running in the opposite direction.

3. In a fire extinguisher, the combination of a pressure tank; a water pump; a connection between the water pump and the tank; a connection between the air pump and the tank; driving shafts for the pumps; driving wheels on the shafts; a ratchet connection between the wheels and the shaft; a reversing motor for driving said wheels, said ratchet being arranged to drive each pump with the gear on the opposite pump running idle.

4. In a fire extinguisher, the combination of a reversing motor; a water pump; an air pump; driving connections between the motor and the pump arranged to drive one pump while the opposite driving connection is running idle and vice versa.

In witness whereof we have hereunto set our hands in the presence of two subscribing witnesses.

MALCOLM C. FAIRWEATHER.
LEROY W. THEIS.

Witnesses:
   FRED C. POWELL,
   E. B. JESSUP.